United States Patent
Oh

(10) Patent No.: US 10,570,830 B2
(45) Date of Patent: Feb. 25, 2020

(54) METHOD AND SYSTEM FOR CONTROLLING INJECTION OF MIXTURE FUEL IN AN INTERNAL COMBUSTION ENGINE

(71) Applicants: Hyundai Motor Company, Seoul (KR); Kia Motors Corporation, Seoul (KR)

(72) Inventor: Young Kyu Oh, Gwacheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 111 days.

(21) Appl. No.: 15/832,539

(22) Filed: Dec. 5, 2017

(65) Prior Publication Data

US 2018/0334971 A1 Nov. 22, 2018

(51) Int. Cl.
| | | |
|---|---|---|
| F02D 19/08 | (2006.01) | |
| F02D 41/40 | (2006.01) | |
| F02D 19/06 | (2006.01) | |
| F02D 41/00 | (2006.01) | |

(52) U.S. Cl.
CPC ......... *F02D 19/084* (2013.01); *F02D 19/061* (2013.01); *F02D 19/087* (2013.01); *F02D 41/0025* (2013.01); *F02D 41/402* (2013.01); *F02D 19/0634* (2013.01); *F02D 19/0655* (2013.01); *F02D 2200/0611* (2013.01)

(58) Field of Classification Search
CPC ............... F02D 19/084; F02D 19/0634; F02D 19/0655; F02D 19/085; F02D 19/0652; F02D 41/402; F02D 41/403
See application file for complete search history.

(56) References Cited

U.S. PATENT DOCUMENTS

| | | | | |
|---|---|---|---|---|
| 6,606,974 B1* | 8/2003 | Duffy | ............. | F02D 41/403 |
| | | | | 123/299 |
| 6,845,608 B2 | 1/2005 | Klenk et al. | | |
| 7,240,660 B1* | 7/2007 | Bryant | ............. | F02D 41/0087 |
| | | | | 123/299 |
| 2010/0012081 A1* | 1/2010 | Ashizawa | ............. | F02B 23/101 |
| | | | | 123/301 |
| 2011/0184629 A1* | 7/2011 | Krengel | ............. | F02D 19/061 |
| | | | | 701/103 |

(Continued)

FOREIGN PATENT DOCUMENTS

| | | |
|---|---|---|
| JP | 2016-176447 A | 10/2016 |
| KR | 10-0719755 B1 | 5/2007 |

*Primary Examiner* — George C Jin
(74) *Attorney, Agent, or Firm* — Morgan, Lewis & Bockius LLP

(57) ABSTRACT

For controlling injection of a mixture fuel of ethanol and gasoline in an internal combustion engine, ethanol concentration of the mixture fuel supplied to the engine is detected, target operation information related to the engine is obtained, a division scheme of a plurality of injection regions is determined based on the ethanol concentration, an injection region corresponding to the target operation information is determined in the determined division scheme of injection regions corresponding to the ethanol concentration, and while performing injection of the mixture fuel corresponding to the determined injection region, at least one of injection timing and injection duration of the mixture fuel is varied according to the ethanol concentration.

16 Claims, 10 Drawing Sheets

(56) References Cited

U.S. PATENT DOCUMENTS

2014/0297159 A1* 10/2014 Surnilla .............. F02D 41/3094
            701/103
2014/0297162 A1* 10/2014 Surnilla .............. F02D 41/3094
            701/104

* cited by examiner

METHOD AND SYSTEM FOR CONTROLLING INJECTION OF MIXTURE FUEL IN AN INTERNAL COMBUSTION ENGINE

CROSS-REFERENCE TO RELATED APPLICATION

The present application claims priority to Korean Patent Application No. 10-2017-0062862 filed on May 22, 2017, and Korean Patent Application No. 10-2017-0150492 filed on Nov. 13, 2017, the entire contents of which is incorporated herein for all purposes by this reference.

BACKGROUND OF THE INVENTION

Field of the Invention

The present invention relates to a method and a system for controlling injection of mixture fuel in an internal combustion engine and system.

Description of Related Art

Recently, a vehicle using bio-energies as fuel is under development to improve environmentally-friendliness and to cope with high petroleum price, and in particular, an ethanol refined from corns or sugarcanes are used as a sort of the bio-energy for vehicles.

Depletion of fossil fuel, mandatory reduction of greenhouse gases, and deepening of energy market unstableness cause attention to the bio-ethanol, which becomes more and more frequently used in many countries including North-American countries.

The bio-ethanol fuel is classified by ethanol ratio included in gasoline. For example, when fuel includes 10% of ethanol, the fuel is denoted as E10. The bio-ethanol has a wide range of ethanol concentration, e.g., E3 to E100, among which E10 and E25 are most typically used.

Recently, a vehicle that may use the ethanol fuel regardless of the ethanol concentration is developed, and such a vehicle is called a flexible fuel vehicle (FFV). Whereas a typical vehicle can only use fuel having a limited range of ethanol concentration, an FFV may use pure gasoline to ethanol fuel of E100 (i.e., pure ethanol) as fuel.

When an air-fuel mixture is over rich or over lean in a cylinder, a combustion speed may be deteriorated, causing deterioration of torque and fuel consumption of the mixture fuel combustion engine.

Therefore, a technology for appropriately controlling combustion of a mixture fuel is necessary, even if ethanol concentration in the mixture may be varied.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a system for controlling injection of a mixture fuel in an internal combustion engine that may stably control an engine even if ethanol concentration may be varied, by effectively operating injection of a mixture fuel with reference to ethanol concentration in the mixture fuel.

An exemplary system for controlling injection of a mixture fuel in an internal combustion engine according to an exemplary embodiment of the present invention may include an ethanol concentration detector configured for detecting ethanol concentration of a mixture fuel supplied to the engine, an engine driving state detection device detecting a driving state of the engine, an injector injecting the mixture fuel into the engine, and a controller that obtains target operation information based on the detected driving state, detects the ethanol concentration by the ethanol concentration detector, and controls the injector based on the ethanol concentration and the target operation information.

The controller determines a division scheme of a plurality of injection regions based on the ethanol concentration, determines an injection region corresponding to the target operation information in the determined division scheme of injection regions corresponding to the ethanol concentration, and while performing injection of the mixture fuel corresponding to the determined injection region, varies at least one of injection timing and injection duration of the mixture fuel according to the ethanol concentration.

An exemplary method for controlling injection of a mixture fuel in an internal combustion engine according to an exemplary embodiment of the present invention may include detecting ethanol concentration of the mixture fuel supplied to the engine, obtaining target operation information related to the engine, determining a division scheme of a plurality of injection regions based on the ethanol concentration, determining an injection region corresponding to the target operation information in the determined division scheme of injection regions corresponding to the ethanol concentration, and, while performing injection of the mixture fuel corresponding to the determined injection region, varying at least one of injection timing and injection duration of the mixture fuel according to the ethanol concentration.

When the ethanol concentration is less than or equal to a predetermined concentration, the plurality of injection regions may include a single injection region and a double injection region; and When the ethanol concentration is above the predetermined concentration, the plurality of injection regions may include a single injection region, a double injection region, and a triple injection region.

The target operation information may include an engine speed and a brake mean effective pressure (BMEP) factor corresponding to a brake mean effective pressure of the engine. The injection region corresponding to the target operation information may be determined among a single injection region, a double injection region, and a triple injection region based on the engine speed and the BMEP factor.

The triple injection region may have a lower end value of the BMEP factor that becomes lower as the ethanol concentration becomes larger, and an upper end value of the engine speed that becomes larger as the ethanol concentration becomes larger.

In the case that the target operation information corresponds to the single injection region, a single injection of the mixture fuel may be performed during an intake stroke, where the injection timing is advanced larger as the ethanol concentration becomes larger when injection timing is adjusted, and the injection duration is adjusted to become larger as the ethanol concentration becomes larger when injection duration is adjusted.

In the case that the target operation information corresponds to the double injection region, a first injection may be performed during an intake stroke and a second injection may be performed during a compression stroke. In the first injection, the injection timing may be advanced larger as the ethanol concentration becomes larger when injection timing is adjusted, and the injection duration may be adjusted to become larger as the ethanol concentration becomes larger when injection duration is adjusted, and In the second injection, the injection timing may be advanced or retarded within a predetermined variation maximum when injection timing is adjusted, and the injection duration may be adjusted to become larger as the ethanol concentration becomes larger when injection duration is adjusted.

In the case that the target operation information corresponds to the triple injection region, a first injection and a second injection subsequent to the first injection may be performed during an intake stroke and a third injection is performed during a compression stroke. In the first injection, the injection timing may be advanced larger as the ethanol concentration becomes larger when injection timing is adjusted, and the injection duration may be adjusted to become larger as the ethanol concentration becomes larger when injection duration is adjusted. In the second injection, the injection timing may be advanced larger as the ethanol concentration becomes larger when injection timing is adjusted, and the injection duration may be adjusted to become larger as the ethanol concentration becomes larger when injection duration is adjusted. In the third injection, the injection timing may be advanced or retarded within a predetermined variation maximum when injection timing is adjusted, and the injection duration may be adjusted to become larger as the ethanol concentration becomes larger when injection duration is adjusted.

For the plurality of injection regions, both of the injection timing and the injection duration of the mixture fuel may be adjusted depending on the ethanol concentration. For the single injection region, a single injection of the mixture fuel may be performed during an intake stroke, and the injection timing advancement and the injection duration may become larger as the ethanol concentration becomes larger;

For the double injection region, a first injection during an intake stroke and a second injection during a compression stroke may be performed, the injection timing advancement and the injection duration may become larger as the ethanol concentration becomes larger in the first injection, and the injection timing may be advanced or retarded within a predetermined variation maximum and the injection duration is adjusted to become larger as the ethanol concentration becomes larger in the second injection. For the triple injection region, a first injection and a second injection subsequent to the first injection may be performed during an intake stroke and a third injection may be performed during a compression stroke. The injection timing advancement and the injection duration may become larger as the ethanol concentration becomes larger in the first injection, the injection timing advancement and the injection duration may become larger as the ethanol concentration becomes larger in the second injection, and the injection timing may be advanced or retarded within a predetermined variation maximum and the injection duration is adjusted to become larger as the ethanol concentration becomes larger in the third injection.

For the single injection region, the injection timing may be advanced between 0 and 60 degrees depending on ethanol concentration. For the double injection region, the injection timing may be advanced between 0 and 60 degrees depending on ethanol concentration in the first injection, and the predetermined variation maximum may be set to 60 degrees in the second injection. For triple injection region, the injection timing may be advanced between 0 and 60 degrees depending on ethanol concentration in the first injection, the injection timing may be advanced between 0 and 100 degrees depending on ethanol concentration in the second injection, and the predetermined variation maximum may be set to 60 degrees in the third injection.

According to an exemplary embodiment of the present invention, a division scheme of a plurality of injection regions is varied depending on an ethanol concentration of a mixture fuel of ethanol and gasoline, and deterioration of combustion stability of an engine depending on the ethanol concentration of the mixture fuel may be prevented.

Furthermore, the injection timing and the injection duration in each injection region are varied in accordance with the ethanol concentration, and the combustion of the engine may be stably controlled regardless of the ethanol concentration of the mixture fuel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
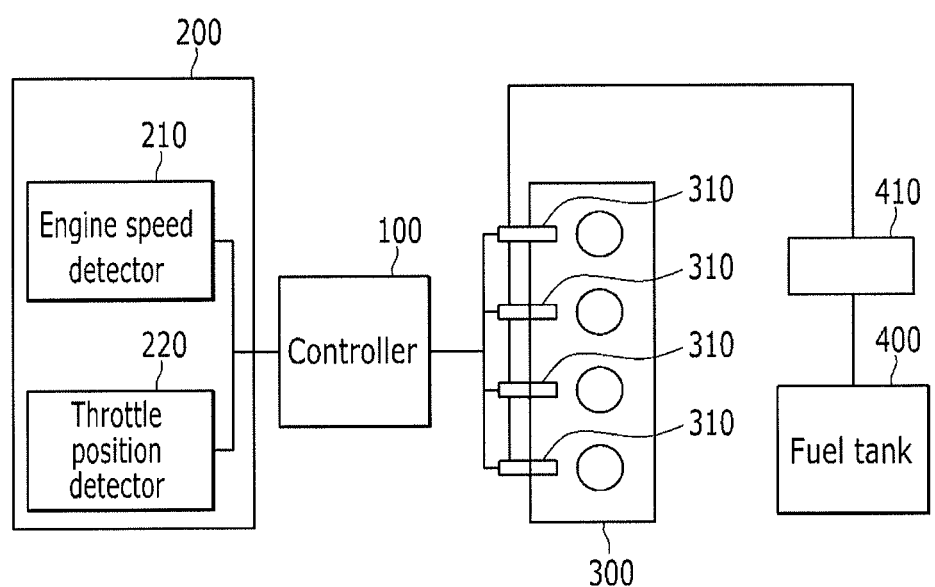
FIG. 1 is a schematic diagram showing a system for controlling injection of a mixture fuel in an internal combustion engine according to an exemplary embodiment.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Furthermore, unless explicitly described to the contrary, the word "comprise" and variations such as "comprises" or "comprising" will be understood to imply the inclusion of stated elements but not the exclusion of any other elements.

Like reference numerals designate like elements throughout the specification.

"Vehicle", "car", "wheels", "automobile", or other similar terminologies used in the specification include vehicles including a passenger vehicle including sports utility vehicles (SUV), a bus, a truck, and various commercial vehicles, a ship including various types of boats or vessels, an airplane, and similar equipment and also include a hybrid vehicle, an electric vehicle, a plug-in hybrid electric vehicle, a hydrogen fuel vehicle, and other alternative fuel (for example, fuel obtained from resources other than petroleum) vehicles.

Furthermore, some methods may be performed by at least one controller. The term controller refers to a hardware device including a memory and a processor which is configured to execute at least one step which is interpreted as an algorithm structure. The memory is configured to store algorithm steps and the processor is configured to execute the algorithm steps to perform at least one process which will be described below.

Furthermore, control logic of the present invention may be implemented by a computer readable medium, which is not temporal, on a computer readable devices including executable program commands which are executed by a processor, a controller or a similar device. Examples of the computer readable devices are not limited to this, but include a ROM, a RAM, a CD-ROM, a magnetic tape, a floppy disk, a flash drive, a smart card, and an optical data storing device. A computer readable reproducing medium is distributed in computer systems which are connected by a network, for example, to be stored and executed by a distributing method by a telematics server or a controller area network (CAN).

A system and a method for controlling injection of a mixture fuel in an internal combustion engine according to an exemplary embodiment of the present invention is hereinafter described more specifically with reference to figures.

FIG. 1 is a schematic diagram showing a system for controlling injection of a mixture fuel in an internal combustion engine according to an exemplary embodiment.

As shown in FIG. 1, a system for controlling injection of a mixture fuel in an internal combustion engine according to an exemplary embodiment is a system that controls injection of the mixture fuel of ethanol and gasoline in an internal combustion engine 300.

For example, the engine 300 may be a conventional gasoline engine, in hardware.

A system for controlling injection of a mixture fuel in an internal combustion engine according to an exemplary embodiment of the present invention includes an ethanol concentration detector 410, an engine driving state detection device 200, an injector 310, and a controller 100. The ethanol concentration detector 410 detects ethanol concentration of a mixture fuel supplied from a fuel tank 400 to the internal combustion engine 300. The engine driving state detection device 200 detecting a driving state of the engine 300. The injector 310 injects the mixture fuel into the engine 300. The controller 100 obtains target operation information based on the detected driving state, detects the ethanol concentration by the ethanol concentration detector, and controls injection of the mixture fuel by controlling the injector 310 based on the ethanol concentration and the target operation information.

The controller 100 determines a division scheme of a plurality of injection regions based on the ethanol concentration and determines an injection region corresponding to the target operation information in the determined division scheme of injection regions corresponding to the ethanol concentration. While controlling the injector 310 to perform injection of the mixture fuel corresponding to the determined injection region, the controller 100 varies at least one of injection timing and injection duration of the mixture fuel according to the ethanol concentration.

The ethanol concentration detector 410 may be a typical ethanol detector.

The driving state detection device 200 may include, for example, an engine speed detector 210 detecting a rotation speed of the engine 300, and a throttle position detector 220 detecting a driver's input with reference to an output torque of the engine 300.

The injector 310 injects the mixture fuel at injection timing and with injection duration under the control of the controller 100, and may be realized as a typical injector.

The controller 100 may be realized as at least one microprocessor, and execute a series of instructions to execute a method according to an exemplary embodiment of the present invention.

Hereinafter, a method for controlling injection of a mixture fuel in an internal combustion engine according to an exemplary embodiment of the present invention is described more specifically with reference to the drawings.

Figure 2:
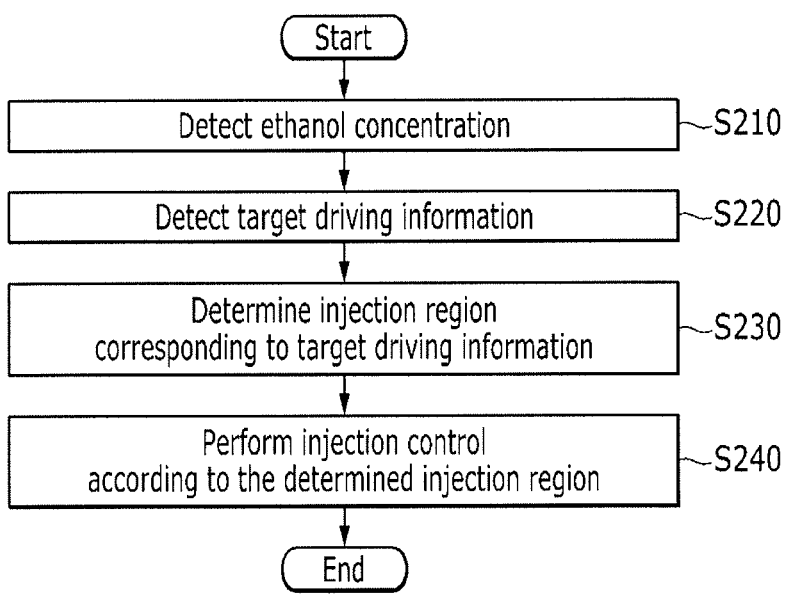
FIG. 2 is a flowchart showing a method for controlling injection of a mixture fuel in an internal combustion engine according to an exemplary embodiment of the present invention.

FIG. 2 is a flowchart showing a method for controlling injection of a mixture fuel in an internal combustion engine according to an exemplary embodiment of the present invention.

As shown in FIG. 2, firstly at step S210, the controller 100 detects ethanol concentration of the mixture fuel supplied to the engine 300. The controller 100 detects ethanol concentration of the mixture fuel by the ethanol concentration detector 410.

In the present embodiment, the ethanol concentration is detected merely by the ethanol concentration detector 410, however, the scope of the present invention is not limited thereto. Depending on embodiments, an oxygen detector or may be further employed to detect oxygen included in an exhaust gas of the engine 300, and, by learning an appropriate air-fuel ratio based on the oxygen detector, the detection value of the ethanol concentration detector 410 may be modified based on the learned air-fuel ratio. Therefore, such a detection value of the ethanol concentration detector 410 modified based on the learned air-fuel ratio may be interpreted as a mere variation of the detected ethanol concentration and included in the scope of the present invention.

Subsequently at step S220, the controller 100 obtains target operation information related to the engine 300.

The target operation information includes an engine speed of the engine 300, and a BMEP factor corresponding to a brake mean effective pressure (BMEP) of the engine 300.

To obtain the target operation information, the controller 100 detects the engine speed by the engine speed detector 210, and detects a throttle position by the throttle position detector 220. The controller 100 may determine the BMEP factor based on the detected throttle position.

In an exemplary embodiment of the present invention, the BMEP factor means a physical quantity that may be equivalently used as a BMEP, and for example, the BMEP factor may be an engine requested torque. The engine requested torque at a specific engine speed may be determined based on the throttle position and the engine speed detected, which is obvious to a person of ordinary skill in the art. Also, it is known to a person of ordinary skill in the art that such an engine requested torque may be used as a physical quantity corresponding to a brake mean effective pressure of the engine.

At step S230, the controller 100 determines a division scheme of a plurality of injection regions based on the ethanol concentration, and determines an injection region corresponding to the target operation information, e.g., the engine speed and the BMEP factor, in the determined division scheme of injection regions corresponding to the ethanol concentration.

FIG. 3, FIG. 4, FIG. 5, FIG. 6, and FIG. 7 illustrate division schemes of a plurality of injection regions according to ethanol concentration.

Figure 3:
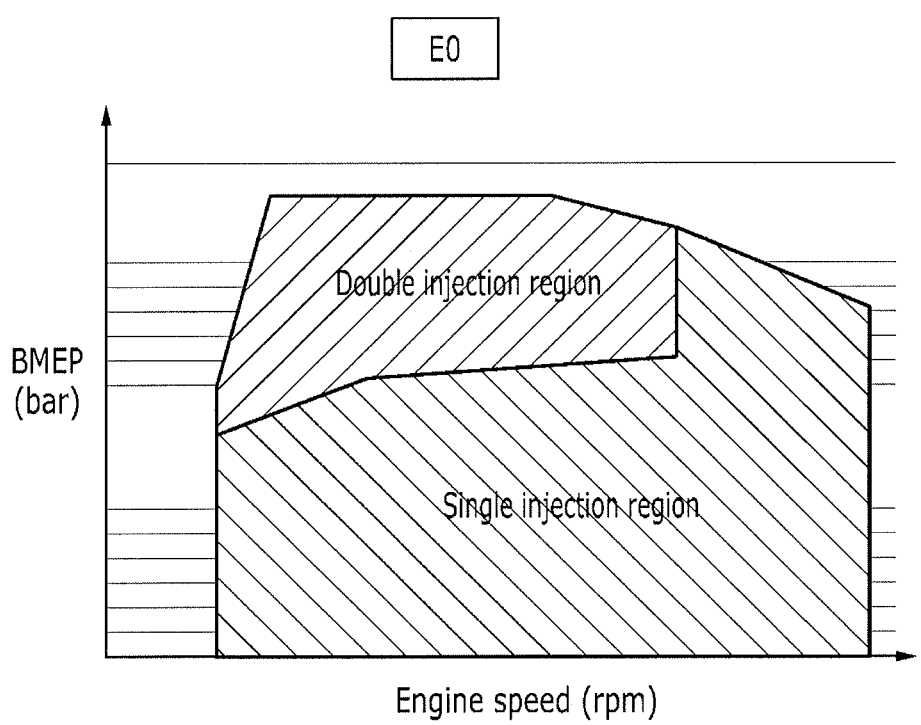
FIG. 3, FIG. 4, FIG. 5, FIG. 6, and FIG. 7 illustrate division schemes of a plurality of injection regions according to ethanol concentration.
Figure 4:
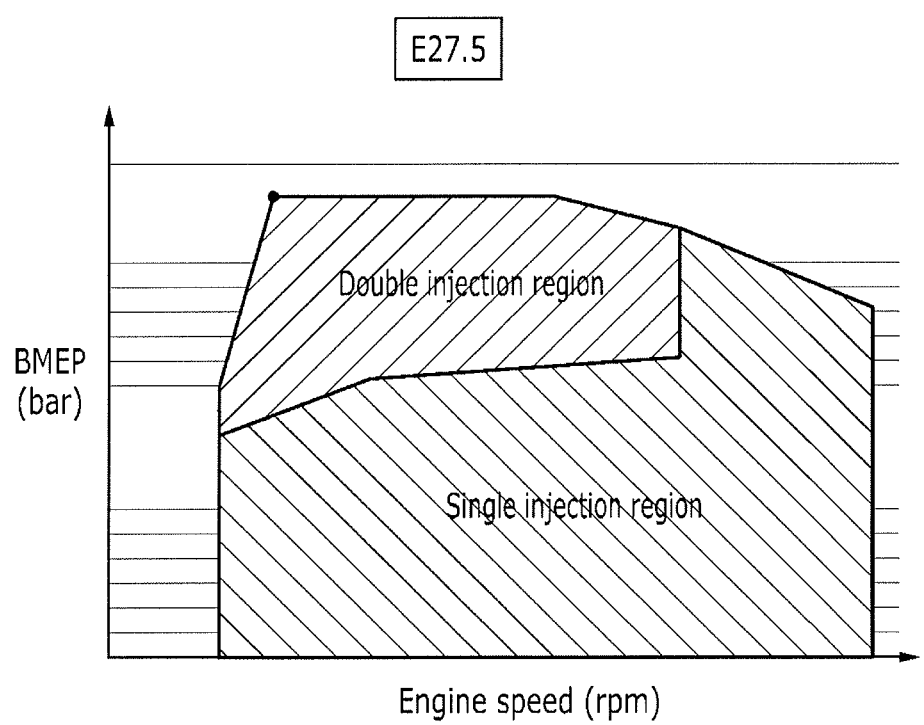

As shown in FIG. 3 and FIG. 4, when the ethanol concentration is less than or equal to a predetermined concentration, a map of target operation information, i.e., a map of the engine speed and the BMEP factor is divided into a single injection region and a double injection region.

Figure 5:
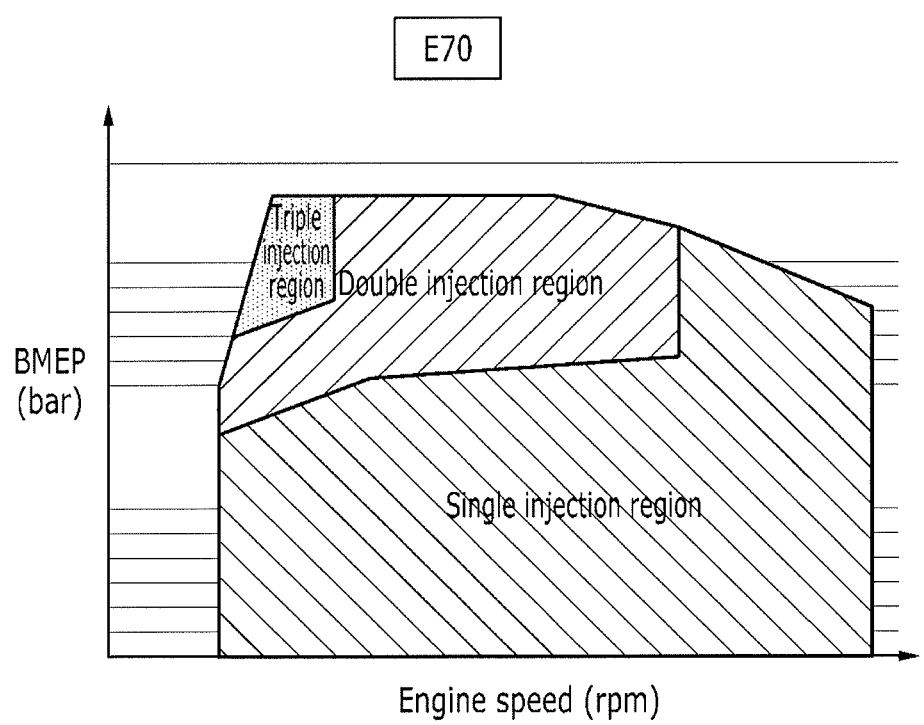
Figure 6:
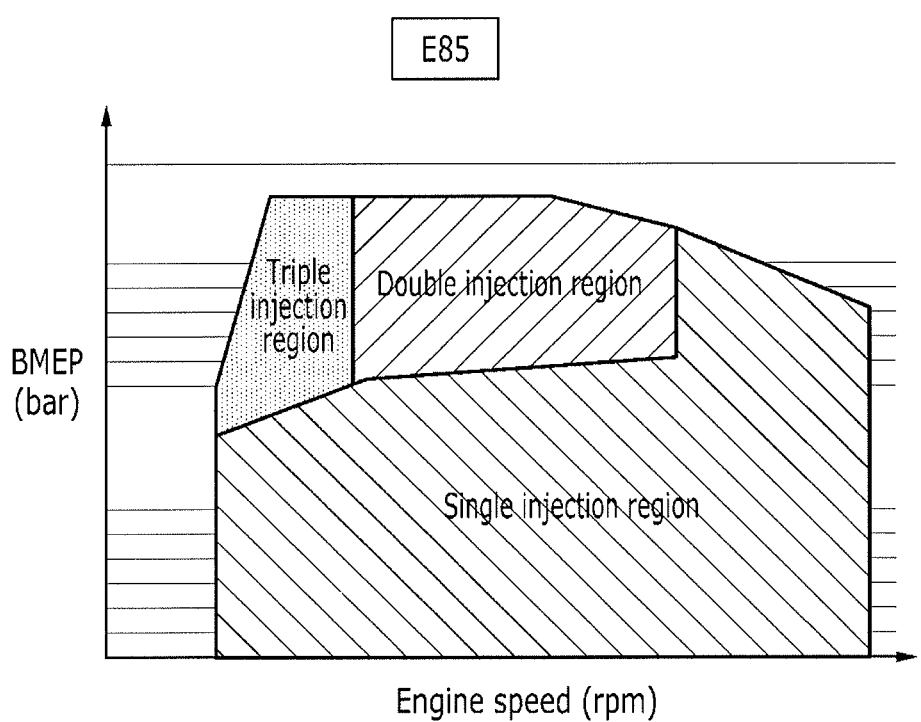
Figure 7:
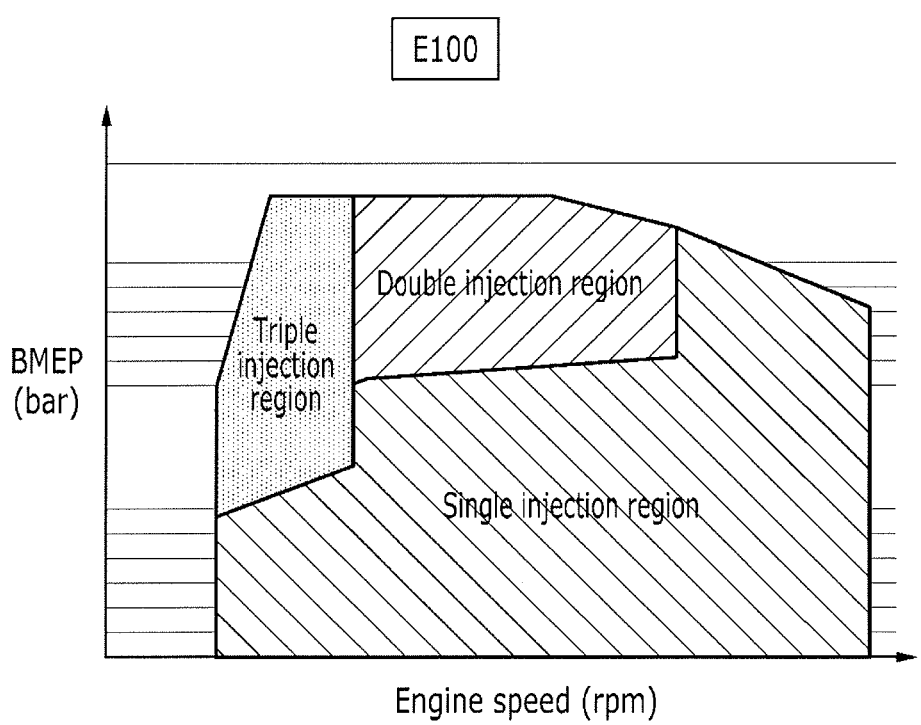

As shown in FIG. 5 to FIG. 7, when the ethanol concentration is above the predetermined concentration, the map of the target operation information is divided to include a single injection region, a double injection region, and a triple injection region.

That is, when the ethanol concentration is above a certain level, the injector 310 is controlled by more stages of injection, and combustion stability of the engine 300 may be enhanced.

In the exemplary embodiment of the present invention, the predetermined ethanol concentration may be predetermined to 27.5%. That is, when the ethanol concentration is less than or equal to 27.5%, a division scheme of injection regions that include a single injection region and a double injection region is selected, as shown in FIG. 3 or FIG. 4. When the ethanol concentration is above 27.5%, a division scheme of injection regions includes a single injection region, a double injection region, and a triple injection region. FIG. 4 illustrates a dot in a top left corner as the point of starting the triple injection region as the ethanol concentration becomes above 27.5%.

As shown in FIG. 5 to FIG. 7, the triple injection region employed when the ethanol concentration is above the predetermined concentration have a lower end value of the BMEP factor and an upper end value of the engine speed. In the present embodiment, the lower end value of the BMEP factor becomes lower as the ethanol concentration becomes larger, and the upper end value of the engine speed becomes larger as the ethanol concentration becomes larger. By such a configuration, the triple injection region may be enlarged as the ethanol concentration increases, and combustion stability of the engine may be maintained for a larger driving condition.

At step S240 after the injection region is determined in accordance with the ethanol concentration and the target operation information, the controller 100 performs injection of the mixture fuel corresponding to the determined injection region by controlling the injector 310 according to an injection scheme of the determined injection region.

In the instant case, the controller 100 may perform a single injection, a double injection, or a triple injection depending on the determined injection region, which will be hereinafter described more specifically with reference to FIG. 8 to FIG. 10.

Figure 8:
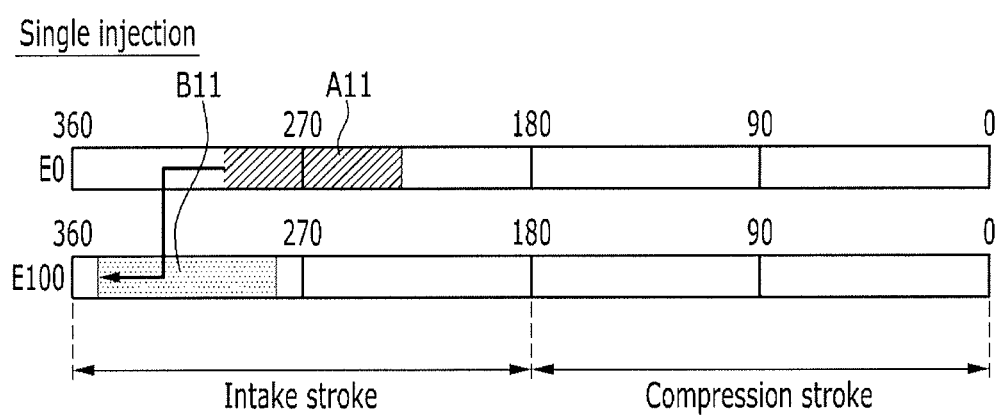
FIG. 8 illustrates injection timing adjustment and injection duration adjustment according to ethanol concentration in a single injection in an exemplary embodiment.

FIG. 8 illustrates injection timing adjustment and injection duration adjustment according to ethanol concentration in a single injection in an exemplary embodiment.

Figure 9:
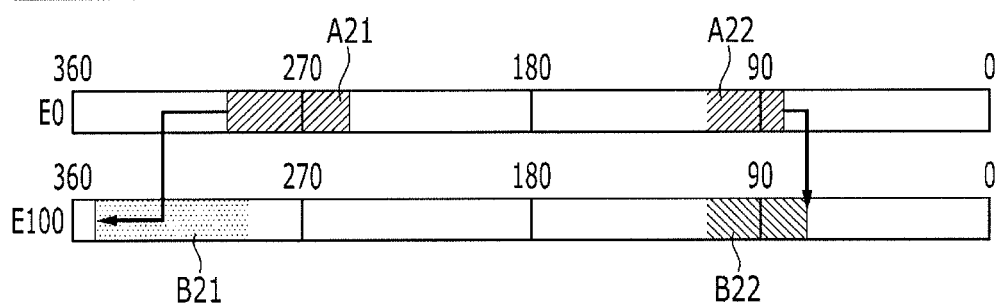
FIG. 9 illustrates injection timing adjustment and injection duration adjustment according to ethanol concentration of first injection and second injection in a double injection in an exemplary embodiment.

FIG. 9 illustrates injection timing adjustment and injection duration adjustment according to ethanol concentration of first injection and second injection in a double injection in an exemplary embodiment.

Figure 10:
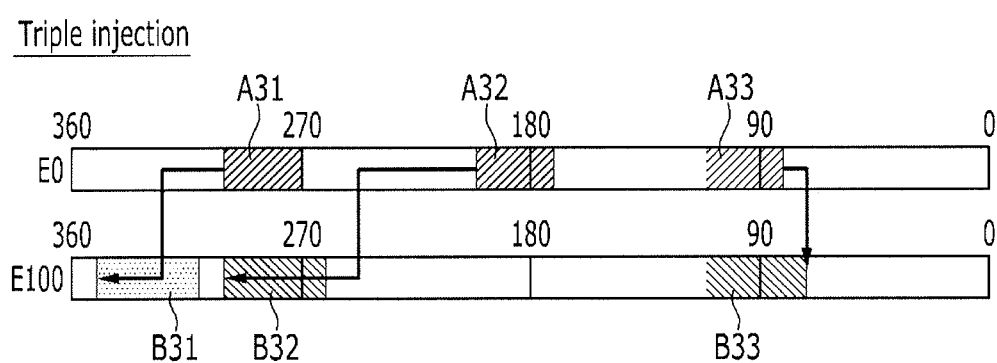
FIG. 10 illustrates injection timing adjustment and injection duration adjustment according to ethanol concentration of first injection, second injection, and third injection in a triple injection in an exemplary embodiment.

FIG. 10 illustrates injection timing adjustment and injection duration adjustment according to ethanol concentration of first injection, second injection, and third injection in a triple injection in an exemplary embodiment.

FIG. 8, FIG. 9 and FIG. 10 illustrates injection timing as a before-top-dead-center (BTDC) angle in an intake stroke and a compression stroke of the engine 300.

As shown in FIG. 8, when the target operation information related to the engine speed and the BMEP factor corresponds to a single injection region, the controller performs a single injection during an intake stroke.

In the instant case, the injection timing and the injection duration is adjusted based on the ethanol concentration of the mixture fuel. In more detail, in comparison with the case that the ethanol concentration is 0%, i.e., the case of pure gasoline, the injection timing is advanced larger as the ethanol concentration becomes larger. Furthermore, in comparison with the case that the ethanol concentration is 0%, the injection duration is adjusted to become larger as the ethanol concentration becomes larger.

FIG. 8 illustrates that, for the single injection B11 for the fuel of E100 having 100% of the ethanol concentration, the injection timing is advanced and the injection duration is increased in comparison with the single injection A11 for the fuel of E0 having 0% of the ethanol concentration.

For example, the advancement of the injection timing may be adjusted in a range of 0 to 60 degrees depending on the ethanol concentration. An adjustment amount of the injection timing advancement and the injection duration according to the ethanol concentration may be appropriately set with reference to FIG. 8 by a person of an ordinary skill in the art in consideration of a detailed specification an engine to which an exemplary embodiment of the present invention will be applied.

As shown in FIG. 9, when the target operation information related to the engine speed and the BMEP factor corresponds to a double injection region, a first injection is performed during an intake stroke and a second injection is performed during a compression stroke.

In the instant case, the injection timing and the injection duration is adjusted based on the ethanol concentration of the mixture fuel.

For the first injection, in comparison with the case that the ethanol concentration is 0%, the injection timing is advanced larger as the ethanol concentration becomes larger. Furthermore, in comparison with the case that the ethanol concentration is 0%, the injection duration is adjusted to become larger as the ethanol concentration becomes larger.

For the second injection, in comparison with the case that the ethanol concentration is 0%, the injection timing is advanced or retarded within a predetermined variation maximum. Furthermore, in comparison with the case that the ethanol concentration is 0%, the injection duration is adjusted to become larger as the ethanol concentration becomes larger.

FIG. 9 illustrates that, for the first injection B21 for the fuel of E100 having 100% of the ethanol concentration, the injection timing is advanced and the injection duration is increased in comparison with injection timing A21 for the fuel of E0 having 0% of the ethanol concentration. Furthermore, FIG. 9 illustrates that, for the second injection B22 for the fuel of E100 having 100% of the ethanol concentration, the injection timing is similar but the injection duration is increased in comparison with a second injection A22 for the fuel of E0 having 0% of the ethanol concentration.

For example, the advancement of the injection timing for the first injection may be adjusted in a range of 0 to 60 degrees depending on the ethanol concentration. The advancement or retardation of the injection timing for second injection may be adjusted in a range of −60 degrees to 60 degrees depending on the ethanol concentration.

FIG. 9 illustrates as if the injection timings of the second injections A22 and B22 are not substantially different in accordance with the ethanol concentration. However, it should be understood that FIG. 9 illustrates a mere example, and the injection timings may be set differently in accordance with the target operation information related to the engine 300.

An adjustment amount of the injection timing advancement and the injection duration for the first and second injection according to the ethanol concentration may be appropriately set with reference to FIG. 9 in consideration of a detailed specification of the engine to which an exemplary embodiment of the present invention will be applied.

As shown in FIG. 10, when the target operation information related to the engine speed and the BMEP factor corresponds to a triple injection region, a first injection and a second injection subsequent to the first injection are performed during an intake stroke and a third injection is performed during a compression stroke.

The first injection of the triple injection is comparable with the first injection of the double injection, and the third injection of the triple injection is comparable with the second injection of the double injection. That is, the triple injection scheme further includes an additional injection in the intake stroke between the first and second injections of the double injection scheme.

For the first injection, in comparison with the case that the ethanol concentration is 0%, the injection timing is advanced larger as the ethanol concentration becomes larger. Furthermore, in comparison with the case that the ethanol concentration is 0%, the injection duration is adjusted to become larger as the ethanol concentration becomes larger.

For the second injection, in comparison with the case that the ethanol concentration is 0%, the injection timing is advanced larger as the ethanol concentration becomes larger. Furthermore, in comparison with the case that the ethanol concentration is 0%, the injection duration is adjusted to become larger as the ethanol concentration becomes larger.

For the third injection, in comparison with the case that the ethanol concentration is 0%, the injection timing is advanced or retarded within a predetermined variation maximum. Furthermore, in comparison with the case that the ethanol concentration is 0%, the injection duration is adjusted to become larger as the ethanol concentration becomes larger.

FIG. 10 illustrates that, for the first injection B31 for the fuel of E100 having 100% of the ethanol concentration, the injection timing is advanced and the injection duration is increased in comparison with injection timing A31 for the fuel of E0 having 0% of the ethanol concentration.

Furthermore, FIG. 10 illustrates that, for the second injection B32 for the fuel of E100 having 100% of the ethanol concentration, the injection timing is advanced and the injection duration is increased in comparison with a second injection A32 for the fuel of E0 having 0% of ethanol concentration.

Furthermore, FIG. 10 illustrates that, for the third injection B33 for the fuel of E100 having 100% of the ethanol concentration, the injection timing is similar but the injection duration is increased in comparison with a third injection A33 for the fuel of E0 having 0% of the ethanol concentration.

For example, the advancement of the injection timing for the first injection may be adjusted in a range of 0 to 60 degrees depending on the ethanol concentration. The advancement of the injection timing for the third injection may be adjusted in a range of 0 to 100 degrees depending on the ethanol concentration. The advancement or retardation of the injection timing for third injection may be adjusted in a range of −60 degrees to 60 degrees depending on the ethanol concentration.

FIG. 10 illustrates as if the injection timings of the third injections A33 and B33 are not substantially different in accordance with the ethanol concentration. However, it should be understood that FIG. 10 illustrates a mere example, and the injection timings may be set differently in accordance with the target operation information related to the engine 300.

An adjustment amount of the injection timing advancement and the injection duration for the first, second and third injection according to the ethanol concentration may be appropriately set with reference to FIG. 10 by a person of an ordinary skill in the art in consideration of a detailed specification an engine to which an exemplary embodiment of the present invention will be applied.

In an exemplary embodiment of the present invention, both of the injection timing and the injection duration are adjusted in accordance with the ethanol concentration in each injection region. However, an exemplary embodiment where only the injection timing is adjusted may be available.

In an exemplary embodiment of the present invention, the injection timing may be determined with respect to a medium value of the injection duration, however, the scope of the present invention is not limited thereto. As a variation, a start-of-injection (SOI) point of the injection duration or an end-of-injection (EOI) of the injection duration may be used as standard for the injection timing.

According to an exemplary embodiment of the present invention, a division scheme of a plurality of injection regions is varied depending on an ethanol concentration of a mixture fuel of ethanol and gasoline, and thereby deterioration of combustion stability of an engine depending on the ethanol concentration of the mixture fuel may be prevented.

Furthermore, the injection timing and the injection duration in each injection region are varied in accordance with the ethanol concentration, and thereby the combustion of the engine may be stably controlled regardless of the ethanol concentration of the mixture fuel.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling injection of a mixture fuel of ethanol and gasoline in an engine, the method comprising:
   detecting ethanol concentration of the mixture fuel supplied to the engine;
   obtaining target operation information related to the engine;
   determining a division scheme of a plurality of injection regions based on the ethanol concentration and determining an injection region corresponding to the target operation information in the determined division scheme of injection regions corresponding to the ethanol concentration; and
   while performing injection of the mixture fuel corresponding to the determined injection region, varying at least one of injection timing and injection duration of the mixture fuel according to the ethanol concentration,
   wherein the target operation information include an engine speed and a brake mean effective pressure (BMEP) factor corresponding to a brake mean effective pressure of the engine, and
   wherein the injection region corresponding to the target operation information is determined among a single injection region, a double injection region, and a triple injection region based on the engine speed and the BMEP factor.

2. The method of claim 1, wherein
   when the ethanol concentration is less than or equal to a predetermined concentration, the plurality of injection regions includes the single injection region and the double injection region; and
   when the ethanol concentration is above the predetermined concentration, the plurality of injection regions includes the single injection region, the double injection region, and the triple injection region.

3. The method of claim 1, wherein
   the triple injection region has a lower end value of the BMEP factor that becomes lower as the ethanol concentration becomes larger; and
   the triple injection region has an upper end value of the engine speed that becomes larger as the ethanol concentration becomes larger.

4. The method of claim 2,
   wherein, when the target operation information corresponds to the single injection region, a single injection of the mixture fuel is performed during an intake stroke,
   wherein the injection timing is advanced larger as the ethanol concentration becomes larger when the injection timing is adjusted, and
   wherein the injection duration is adjusted to become larger as the ethanol concentration becomes larger when the injection duration is adjusted.

5. The method of claim 2,
   wherein, when the target operation information corresponds to the double injection region, a first injection is performed during an intake stroke and a second injection is performed during a compression stroke,
   wherein, in the first injection, the injection timing is advanced larger as the ethanol concentration becomes larger when the injection timing is adjusted, and the injection duration is adjusted to become larger as the ethanol concentration becomes larger when the injection duration is adjusted, and
   wherein, in the second injection, the injection timing is advanced or retarded within a predetermined variation maximum when the injection timing is adjusted, and the injection duration is adjusted to become larger as the ethanol concentration becomes larger when the injection duration is adjusted.

6. The method of claim 2,
   wherein, when the target operation information corresponds to the triple injection region, a first injection and a second injection subsequent to the first injection are performed during an intake stroke and a third injection is performed during a compression stroke,
   in the first injection, the injection timing is advanced larger as the ethanol concentration becomes larger when the injection timing is adjusted, and the injection duration is adjusted to become larger as the ethanol concentration becomes larger when the injection duration is adjusted,
   in the second injection, the injection timing is advanced larger as the ethanol concentration becomes larger when the injection timing is adjusted, and the injection duration is adjusted to become larger as the ethanol concentration becomes larger when the injection duration is adjusted, and
   in the third injection, the injection timing is advanced or retarded within a predetermined variation maximum when the injection timing is adjusted, and the injection duration is adjusted to become larger as the ethanol concentration becomes larger when the injection duration is adjusted.

7. The method of claim 2, wherein
   for the plurality of injection regions, both of the injection timing and the injection duration of the mixture fuel are adjusted depending on the ethanol concentration;
   for the single injection region, a single injection of the mixture fuel is performed during an intake stroke, and an injection timing advancement and the injection duration become larger as the ethanol concentration becomes larger;
   for the double injection region, a first injection during an intake stroke and a second injection during a compression stroke are performed, the injection timing advancement and the injection duration become larger as the ethanol concentration becomes larger in the first injection of the double injection region, and the injection timing is advanced or retarded within a predetermined variation maximum and the injection duration is adjusted to become larger as the ethanol concentration becomes larger in the second injection of the double injection region;
   for the triple injection region, a first injection and a second injection subsequent to the first injection are performed during an intake stroke and a third injection is performed during a compression stroke, the injection timing advancement and the injection duration become larger as the ethanol concentration becomes larger in the first injection of the triple injection region, the injection timing advancement and the injection duration become larger as the ethanol concentration becomes larger in the second injection of the triple injection region, and the injection timing is advanced or retarded within a predetermined variation maximum and the injection duration is adjusted to become larger as the ethanol concentration becomes larger in the third injection of the triple injection region.

8. The method of claim 7, wherein
for the single injection region, the injection timing is advanced between 0 and 60 degrees depending on the ethanol concentration;
for the double injection region, the injection timing is advanced between 0 and 60 degrees depending on the ethanol concentration in the first injection, and the predetermined variation maximum is set to 60 degrees in the second injection;
for triple injection region, the injection timing is advanced between 0 and 60 degrees depending on the ethanol concentration in the first injection, the injection timing is advanced between 0 and 100 degrees depending on the ethanol concentration in the second injection, and the predetermined variation maximum is set to 60 degrees in the third injection.

9. A system for controlling injection of a mixture fuel of ethanol and gasoline in an engine, the system comprising:
an ethanol concentration detector detecting ethanol concentration of the mixture fuel supplied to the engine;
an engine driving state detection device detecting a driving state of the engine;
an injector injecting the mixture fuel into the engine; and
a controller that is configured to obtain target operation information based on the detected driving state, is configured to detect the ethanol concentration by the ethanol concentration detector, and is configured to control the injector based on the ethanol concentration and the target operation information,
wherein the controller is configured to determine a division scheme of a plurality of injection regions based on the ethanol concentration, is configured to determine an injection region corresponding to the target operation information in the determined division scheme of injection regions corresponding to the ethanol concentration, and while performing injection of the mixture fuel corresponding to the determined injection region, is configured to vary at least one of injection timing and injection duration of the mixture fuel according to the ethanol concentration,
wherein the target operation information include an engine speed and a brake mean effective pressure (BMEP) factor corresponding to a brake mean effective pressure of the engine, and
wherein the controller is configured to determine the injection region corresponding to the target operation information among a single injection region, a double injection region, and a triple injection region based on the engine speed and the BMEP factor, and is configured to control the injector according to an injection scheme of the determined injection region.

10. The system of claim 9, wherein
when the ethanol concentration is less than or equal to a predetermined concentration, the plurality of injection regions includes the single injection region and the double injection region; and
when the ethanol concentration is above the predetermined concentration, the plurality of injection regions includes the single injection region, the double injection region, and the triple injection region.

11. The system of claim 9, wherein
the triple injection region has a lower end value of the BMEP factor that becomes lower as the ethanol concentration becomes larger; and
the triple injection region has an upper end value of the engine speed that becomes larger as the ethanol concentration becomes larger.

12. The system of claim 10,
wherein, when the target operation information corresponds to the single injection region, the controller is configured to control the injector to perform a single injection of the mixture fuel during an intake stroke,
wherein the injection timing is advanced larger as the ethanol concentration becomes larger when the injection timing is adjusted, and
wherein the injection duration is adjusted to become larger as the ethanol concentration becomes larger when the injection duration is adjusted.

13. The system of claim 10,
wherein, when the target operation information corresponds to the double injection region, a first injection is performed during an intake stroke and a second injection is performed during a compression stroke,
wherein, in the first injection, the injection timing is advanced larger as the ethanol concentration becomes larger when the injection timing is adjusted, and the injection duration is adjusted to become larger as the ethanol concentration becomes larger when the injection duration is adjusted, and
wherein, in the second injection, the injection timing is advanced or retarded within a predetermined variation maximum when the injection timing is adjusted, and the injection duration is adjusted to become larger as the ethanol concentration becomes larger when the injection duration is adjusted.

14. The system of claim 10, wherein
wherein, when the target operation information corresponds to the triple injection region, a first injection and a second injection subsequent to the first injection are performed during an intake stroke and a third injection is performed during a compression stroke,
in the first injection, the injection timing is advanced larger as the ethanol concentration becomes larger when the injection timing is adjusted, and the injection duration is adjusted to become larger as the ethanol concentration becomes larger when the injection duration is adjusted,
in the second injection, the injection timing is advanced larger as the ethanol concentration becomes larger when the injection timing is adjusted, and the injection duration is adjusted to become larger as the ethanol concentration becomes larger when the injection duration is adjusted, and
in the third injection, the injection timing is advanced or retarded within a predetermined variation maximum when the injection timing is adjusted, and the injection duration is adjusted to become larger as the ethanol concentration becomes larger when the injection duration is adjusted.

15. The system of claim 10, wherein
for the plurality of injection regions, both of the injection timing and the injection duration of the mixture fuel are adjusted depending on the ethanol concentration;
for the single injection region, the controller is configured to control the injector such that a single injection of the mixture fuel is performed during an intake stroke, and an injection timing advancement and the injection duration become larger as the ethanol concentration becomes larger;

for the double injection region, the controller is configured to control the injector such that a first injection during an intake stroke and a second injection during a compression stroke are performed, the injection timing advancement and the injection duration become larger as the ethanol concentration becomes larger in the first injection, and the injection timing is advanced or retarded within a predetermined variation maximum and the injection duration is adjusted to become larger as the ethanol concentration becomes larger in the second injection;

for the triple injection region, the controller is configured to control the injector such that a first injection and a second injection subsequent to the first injection are performed during an intake stroke and a third injection is performed during a compression stroke, the injection timing advancement and the injection duration become larger as the ethanol concentration becomes larger in the first injection, the injection timing advancement and the injection duration become larger as the ethanol concentration becomes larger in the second injection, and the injection timing is advanced or retarded within a predetermined variation maximum and the injection duration is adjusted to become larger as the ethanol concentration becomes larger in the third injection.

16. The system of claim 15, wherein for the single injection region, the injection timing is advanced between 0 and 60 degrees depending on the ethanol concentration;

for the double injection region, the injection timing is advanced between 0 and 60 degrees depending on the ethanol concentration in the first injection, and the predetermined variation maximum is set to 60 degrees in the second injection;

for triple injection region, the injection timing is advanced between 0 and 60 degrees depending on the ethanol concentration in the first injection, the injection timing is advanced between 0 and 100 degrees depending on the ethanol concentration in the second injection, and the predetermined variation maximum is set to 60 degrees in the third injection.

* * * * *

UNITED STATES PATENT AND TRADEMARK OFFICE
CERTIFICATE OF CORRECTION

PATENT NO. : 10,570,830 B2  
APPLICATION NO. : 15/832539  
DATED : February 25, 2020  
INVENTOR(S) : Young Kyu Oh Page 1 of 1

It is certified that error appears in the above-identified patent and that said Letters Patent is hereby corrected as shown below:

On the Title Page

Please insert the following missing foreign priority information:  
-- (30) Foreign Application Priority Data:  
May 22, 2017 (KR) .................. 10-2017-0062862  
November 13, 2017 (KR) .................. 10-2017-0150492 --.

Signed and Sealed this  
Twelfth Day of May, 2020

Andrei Iancu  
*Director of the United States Patent and Trademark Office*